(12) United States Patent
Wang et al.

(10) Patent No.: US 11,902,087 B2
(45) Date of Patent: Feb. 13, 2024

(54) FORWARDING FAULT LOCATION DETERMINING METHOD AND DEVICE

(71) Applicant: Huawei Technologies Co., Ltd., Shenzhen (CN)

(72) Inventors: Zhongyu Wang, Nanjing (CN); Dewei Bao, Nanjing (CN); Liang Zhang, Nanjing (CN); Tao Feng, Beijing (CN); Zhiping Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 17/361,733

(22) Filed: Jun. 29, 2021

(65) Prior Publication Data
US 2021/0328859 A1 Oct. 21, 2021

Related U.S. Application Data

(63) Continuation of application No. PCT/CN2019/128517, filed on Dec. 26, 2019.

(30) Foreign Application Priority Data

Dec. 29, 2018 (CN) .......................... 201811634089.1

(51) Int. Cl.
*H04L 41/0677* (2022.01)
*H04L 43/0817* (2022.01)
(Continued)

(52) U.S. Cl.
CPC ...... *H04L 41/0677* (2013.01); *H04L 43/0817* (2013.01); *H04L 45/28* (2013.01); *H04L 45/745* (2013.01)

(58) Field of Classification Search
CPC . H04L 41/0677; H04L 43/0817; H04L 45/28; H04L 45/745; H04L 41/40; H04L 45/42; H04L 45/54; H04L 45/64
See application file for complete search history.

(56) References Cited

U.S. PATENT DOCUMENTS

| 7,738,465 B2 * | 6/2010 | Akahane ................. H04L 43/00 709/224 |
| 11,522,797 B2 * | 12/2022 | C H ......................... H04L 43/20 |

(Continued)

FOREIGN PATENT DOCUMENTS

| CN | 101107824 A | 1/2008 |
| CN | 102868553 A | 1/2013 |

(Continued)

OTHER PUBLICATIONS

VeriTable: Fast Equivalence Verification of Multiple Large Forwarding Tables, G. Grigoryan, IEEE (Year: 2018).*

(Continued)

*Primary Examiner* — Habte Mered
(74) *Attorney, Agent, or Firm* — Conley Rose, P.C.

(57) ABSTRACT

In a forwarding fault location determining method, a controller receives a plurality of table search statistical results of a plurality of forwarding tables for a first service from one or more forwarders. The plurality of forwarding tables include a first forwarding table and a second forwarding table, and the first forwarding table is prior to the second forwarding table in terms of a search sequence. Subsequently, the controller determines that table search behavior of the first forwarding table for the first service is normal and table search behavior of the second forwarding table for the first service is abnormal. The controller determines, based on the determining result, that the second forwarding table is a faulty forwarding table for the first service.

20 Claims, 6 Drawing Sheets

(51) Int. Cl.
  *H04L 45/28* (2022.01)
  *H04L 45/745* (2022.01)

(56) References Cited

U.S. PATENT DOCUMENTS

| | | |
|---|---|---|
| 2015/0131666 A1 | 5/2015 | Kang et al. |
| 2015/0381324 A1 | 12/2015 | Mirsky et al. |
| 2017/0302504 A1* | 10/2017 | Wang ............... H04L 45/02 |
| 2017/0324651 A1* | 11/2017 | Penno ............... H04L 45/26 |
| 2018/0227209 A1* | 8/2018 | Lin ............... H04L 61/251 |
| 2018/0375770 A1* | 12/2018 | Li ............... H04L 43/0823 |
| 2020/0403849 A1 | 12/2020 | Li et al. |

FOREIGN PATENT DOCUMENTS

| | | |
|---|---|---|
| CN | 103475507 A * | 12/2013 |
| CN | 105827419 A | 8/2016 |
| CN | 105827524 A | 8/2016 |
| CN | 106330506 A | 1/2017 |
| CN | 106375105 A | 2/2017 |
| CN | 107005481 A | 8/2017 |
| CN | 107171883 A | 9/2017 |
| CN | 107800630 A | 3/2018 |
| WO | 2013151550 A1 | 10/2013 |

OTHER PUBLICATIONS

Hu, Y., et al., "Enabling Efficient Network Service Function Chain Deployment on Heterogeneous Server Platform," IEEE International Symposium on High Performance Computer Architecture, Feb. 24, 2018, 14 pages.

* cited by examiner

605 — A controller receives a search statistical result of a fourth forwarding table for a first service and a search statistical result of a fifth forwarding table for the first service, where the fourth forwarding table is prior to a first forwarding table in terms of a search sequence, the fifth forwarding table is posterior to a second forwarding table in terms of the search sequence, the controller does not receive a search statistical result of a forwarding table between the fourth forwarding table and the fifth forwarding table for the first service, and the fourth forwarding table and the fifth forwarding table both belong to a plurality of forwarding tables 610 — The controller determines third information, where the third information indicates that table search behavior of the fourth forwarding table for the first service is normal and table search behavior of the fifth forwarding table for the first service is abnormal 615 — The controller requests, based on the third information, the search statistical result of the forwarding table between the fourth forwarding table and the fifth forwarding table for the first service from a forwarder in which the forwarding table between the fourth forwarding table and the fifth forwarding table is located

FORWARDING FAULT LOCATION DETERMINING METHOD AND DEVICE

CROSS-REFERENCE TO RELATED APPLICATIONS

This is a continuation of Int'l Patent App. No. PCT/CN2019/128517, filed on Dec. 26, 2019, which claims priority to Chinese Patent App. No. 201811634089.1, filed on Dec. 29, 2018, which are incorporated by reference.

FIELD

This disclosure relates to the communications field, and in particular, to a forwarding fault location determining method and device.

BACKGROUND

In a network communication process, if a forwarding fault occurs during data transmission, all network administrators want to locate and rectify the fault as soon as possible, so as to restore a network to a normal state. In a process of restoring a network from a faulty state to a normal state, fault locating is most time consuming. Therefore, to quickly restore a network on which a forwarding fault occurs, the forwarding fault needs to be located as soon as possible. On a network including a plurality of forwarding devices, a forwarding fault caused when a packet fails to be forwarded on the network frequently occurs. Networking is complex, and a packet forwarding process relates to a plurality of forwarding devices. Consequently, forwarding fault locating is very difficult and relatively time consuming, consumes a relatively large amount of manpower, and imposes a very high skill requirement on a person who performs fault locating.

SUMMARY

The embodiments provide a forwarding fault location determining method and device.

One aspect provides a forwarding fault location determining method. The method includes: A controller receives a plurality of table search statistical results of a plurality of forwarding tables for a first service from one or more forwarders, where a search sequence exists between the plurality of forwarding tables for the first service, the plurality of forwarding tables include a first forwarding table and a second forwarding table that is adjacent to the first forwarding table in terms of the search sequence, and the first forwarding table is prior to the second forwarding table in terms of the search sequence. The controller determines first information based on a table search statistical result of the first forwarding table for the first service and a table search statistical result of the second forwarding table for the first service, where the first information indicates that (1) table search behavior of the first forwarding table for the first service is normal and (2) table search behavior of the second forwarding table for the first service is abnormal. The controller determines, based on the first information, that the second forwarding table is a faulty forwarding table for the first service.

In a possible design, the plurality of forwarding tables further include a third forwarding table, the third forwarding table is posterior to the second forwarding table in terms of the search sequence, and the method includes: The controller determines second information, where the second information indicates that a table search statistical result of a third forwarding table for the first service is the same as or similar to the table search statistical result of the second forwarding table for the first service. The controller determines, based on the second information, that the third forwarding table is a non-faulty forwarding table for the first service.

In a possible design, the plurality of forwarding tables further include a fourth forwarding table and a fifth forwarding table, and that the controller receives a plurality of table search statistical results of a plurality of forwarding tables for a first service includes: The controller receives a search statistical result of the fourth forwarding table for the first service and a search statistical result of the fifth forwarding table for the first service, where the fourth forwarding table is prior to the first forwarding table in terms of the search sequence, the fifth forwarding table is posterior to the second forwarding table in terms of the search sequence, and the controller does not receive a search statistical result of a forwarding table between the fourth forwarding table and the fifth forwarding table for the first service. The controller determines third information, where the third information indicates that table search behavior of the fourth forwarding table for the first service is normal and table search behavior of the fifth forwarding table for the first service is abnormal. The controller requests, based on the third information, the search statistical result of the forwarding table between the fourth forwarding table and the fifth forwarding table for the first service from a forwarder in which the forwarding table between the fourth forwarding table and the fifth forwarding table is located.

In a possible design, that the controller determines, based on the first information, that the second forwarding table is a faulty forwarding table includes: The controller determines a table search statistical result of a sixth forwarding table for the first service, where a type of the sixth forwarding table is the same as a type of the second forwarding table, the sixth forwarding table is prior to the second forwarding table in terms of the search sequence, and the sixth forwarding table and the second forwarding table are located in different forwarders. The controller determines fourth information, where the fourth information indicates that the table search statistical result of the sixth forwarding table for the first service is different from and not similar to the table search statistical result of the second forwarding table for the first service. The controller determines, based on the first information and the fourth information, that the second forwarding table is a faulty forwarding table.

In a possible design, the first forwarding table and the second forwarding table are located in one forwarder, or located in different forwarders.

In a possible design, the controller is a software-defined networking (SDN) controller, and the forwarder is an SDN forwarder.

In a possible design, the first service is a native Internet Protocol version 4 (IPv4) service, an IPv4 over Generic Routing Encapsulation (GRE) service, a native Internet Protocol version 6 (IPv6) service, an IPv6 over IPv4 service, a layer 3 virtual private network over (L3VPN) over segment routing (SR) service, a layer 2 virtual private network (L2VPN) over traffic engineering (TE) service, or an Ethernet virtual private network (EVPN) over Virtual Extensible Local Area Network (VxLAN) service.

In a possible design, the first service is an IPv4 service, an IPv6 service, an L3VPN service, an L2VPN service, or an EVPN service.

Another aspect provides a controller. The controller includes: a receiving unit configured to receive a plurality of table search statistical results of a plurality of forwarding tables for a first service from one or more forwarders, where a search sequence exists between the plurality of forwarding tables for the first service, the plurality of forwarding tables include a first forwarding table and a second forwarding table that is adjacent to the first forwarding table in terms of the search sequence, and the first forwarding table is prior to the second forwarding table in terms of the search sequence; a status determining unit configured to determine first information based on a table search statistical result of the first forwarding table for the first service and a table search statistical result of the second forwarding table for the first service, where the first information indicates that (1) table search behavior of the first forwarding table for the first service is normal and (2) table search behavior of the second forwarding table for the first service is abnormal; and a fault determining unit configured to determine, based on the first information, that the second forwarding table is a faulty forwarding table for the first service.

In a possible design, the fault determining unit is further configured to: determine second information, where the second information indicates that a table search statistical result of a third forwarding table for the first service is the same as or similar to the table search statistical result of the second forwarding table for the first service; and determine, based on the second information, that the third forwarding table is a non-faulty forwarding table for the first service.

In a possible design, the plurality of forwarding tables further include a fourth forwarding table and a fifth forwarding table. The receiving unit is further configured to: receive a search statistical result of the fourth forwarding table for the first service and a search statistical result of the fifth forwarding table for the first service, where the fourth forwarding table is prior to the first forwarding table in terms of the search sequence, the fifth forwarding table is posterior to the second forwarding table in terms of the search sequence, and the controller does not receive a search statistical result of a forwarding table between the fourth forwarding table and the fifth forwarding table for the first service; determine third information, where the third information indicates that table search behavior of the fourth forwarding table for the first service is normal and table search behavior of the fifth forwarding table for the first service is abnormal; and request, based on the third information, the search statistical result of the forwarding table between the fourth forwarding table and the fifth forwarding table for the first service from a forwarder in which the forwarding table between the fourth forwarding table and the fifth forwarding table is located.

In a possible design, the fault determining unit is further configured to: determine a table search statistical result of a sixth forwarding table for the first service, where a type of the sixth forwarding table is the same as a type of the second forwarding table, the sixth forwarding table is prior to the second forwarding table in terms of the search sequence, and the sixth forwarding table and the second forwarding table are located in different forwarders; determine fourth information, where the fourth information indicates that the table search statistical result of the sixth forwarding table for the first service is different from and not similar to the table search statistical result of the second forwarding table for the first service; and determine, based on the first information and the fourth information, that the second forwarding table is a faulty forwarding table.

In a possible design, the first forwarding table and the second forwarding table are located in one forwarder, or located in different forwarders.

In a possible design, the controller is an SDN controller, and the forwarder is an SDN forwarder.

In a possible design, the first service is a native IPv4 service, an IPv4 over GRE service, a native IPv6 service, an IPv6 over IPv4 service, an L3VPN over SR service, an L2VPN over TE service, or an EVPN over VxLAN service.

In a possible design, the first service is an IPv4 service, an IPv6 service, an L3VPN service, an L2VPN service, or an EVPN service.

According to the fault determining method and the controller, in addition to locating a forwarding device on which a forwarding fault occurs, the controller can further efficiently determine a forwarding table on which a forwarding faulty occurs. Therefore, a fault can be located more accurately and recovered more quickly.

DETAILED DESCRIPTION

Figure 1:
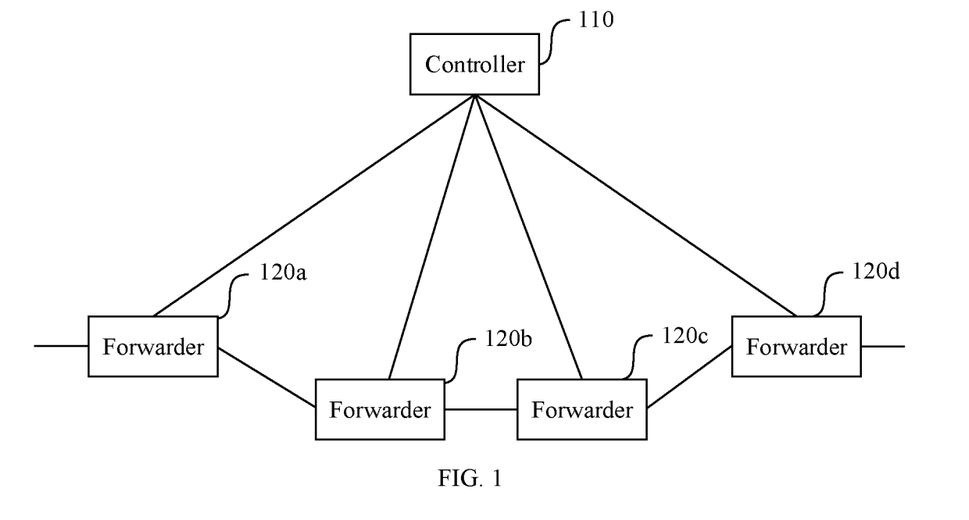
FIG. 1 is a schematic structural diagram of a network 100 according to an embodiment.

FIG. 1 is a schematic structural diagram of a network according to an embodiment. FIG. 1 is a schematic structural diagram of a network 100. The network 100 includes a controller 110 and forwarders 120 (120a to 120d). Each forwarder is connected to the controller 110 and is controlled by the controller 110. In this embodiment, a quantity of forwarders may change, and the network 100 may include more or fewer forwarders. In the network 100 shown in FIG. 1, the forwarder 120a and the forwarder 120d may be provider edge (PE) devices, and the forwarder 120b and the forwarder 120c may be provider (P) devices. There may be one or more P devices between the forwarder 120b and the forwarder 120c. These P devices are located inside an operator network. The forwarder 120a and the forwarder 120d are located at the edge of the operator network and are configured to connect to a user network or another operator network. The forwarders 120a to 120d may alternatively be forwarders in one enterprise network, or may be forwarders in a data center inside one enterprise or one operator. The forwarders 120a and 120d are not forwarders that need to be located at the network edge, and may also be forwarders located inside the network. The controller 110 may be an SDN controller, and the forwarders 120a to 120d may be SDN forwarders. Alternatively, the controller 110 may be a network management device in a conventional Internet Protocol (IP) network, and the forwarders 120a to 120d may be switches or routers in the conventional IP network.

To forward one packet, one forwarder may need to search different forwarding tables for the packet, and different forwarders may need to search different forwarding tables for the packet, so as to forward the packet.

Figure 2:
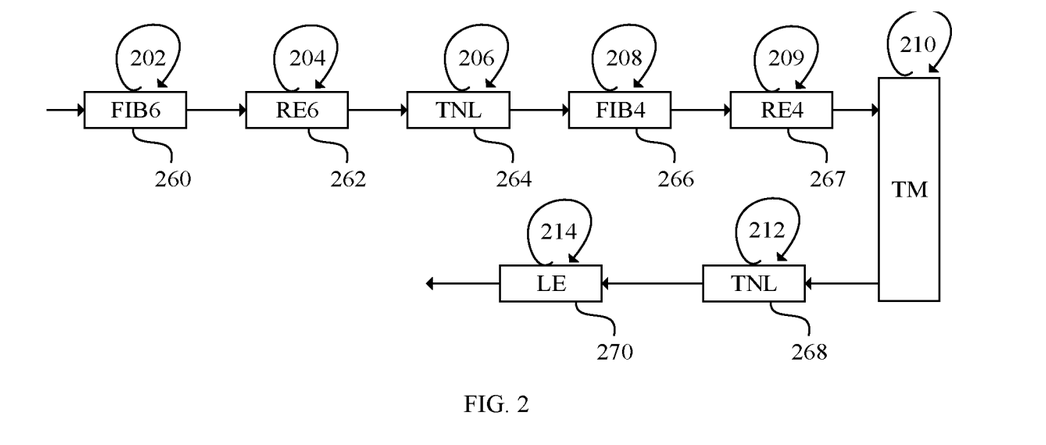
FIG. 2 is a flowchart of a method 200 for searching different forwarding tables in one forwarder according to an embodiment.

FIG. 2 is a flowchart of a method 200 for searching different forwarding tables in one forwarder according to an embodiment.

202: A forwarder such as a forwarder 120a searches a forwarding information base (FIB)6 260 based on a virtual router identifier (VRID) carried in a received packet and a destination IP address of the packet, to obtain one router entry (RE) index, where the destination IP address of the packet is an IPv6 address.

204: The forwarder determines a router entry RE6 262 based on the RE index, and further searches the RE6 262 by using the destination IP address of the packet, to obtain a next-hop IP address of the packet and one tunnel index.

206: Search a tunnel entry (TNL) 264 based on the tunnel index to obtain a tunnel type and a destination IP address of a tunnel, where the destination IP address of the tunnel is an IPv4 address.

208: Search an IPv4 forwarding information base based on the destination IP address of the tunnel to find an entry FIB4 266 through matching, so as to obtain one RE index.

209: The forwarder determines a router entry RE4 267 based on the index obtained in step 208, and further searches the router entry RE4 267 by using the destination IP address of the tunnel, to obtain outbound port information and a next-hop IP address of the packet, where the outbound port information includes a port number or a TRUNK ID.

210: A traffic management (TM) module sends the packet from an inbound interface board to an outbound interface board. It should be noted that, in this embodiment, the forwarder has an inbound interface board and an outbound interface board that are independent of each other. A packet is sent to the forwarder through the inbound interface board and then sent from the forwarder through the outbound interface board. Step 202 to step 206 are performed by the inbound interface board, and step 212 and subsequent operations are performed by the outbound interface board. However, a specific forwarder may include an interface board having both a packet receiving capability and a packet sending capability. In this case, the forwarder may include only one interface board, or may include a plurality of interface boards. When the interface board having receiving and sending capabilities receives a packet, the TM module does not need to or cannot send the packet from the interface board to another interface board, and instead, the interface board sends the packet.

212: Search a tunnel table based on a tunnel index to find a TNL 268 through matching, so as to obtain a tunnel encapsulation mode, a source IP address, a destination IP address, an outbound port VLAN identifier (OVID), a maximum transmission unit (MTU), and the like. In this embodiment, the tunnel encapsulation mode may be an IPv6 over IPv4 (IPv6 over IPv4) mode.

214: Search a link layer encapsulation table based on the outbound port information and the next-hop IP address that are obtained in step 209 and the OVID that is obtained in step 212, to find a link layer encapsulation entry 270 through matching, so as to obtain a destination media access control (MAC) address; and perform corresponding link layer encapsulation based on the destination MAC address and other related information, to transmit an IPv6 over IPv4 tunnel packet on the tunnel, where an outer destination IP address of the tunnel packet is an address in an IPv4 format, that is, an IPv4 address.

Figure 3:
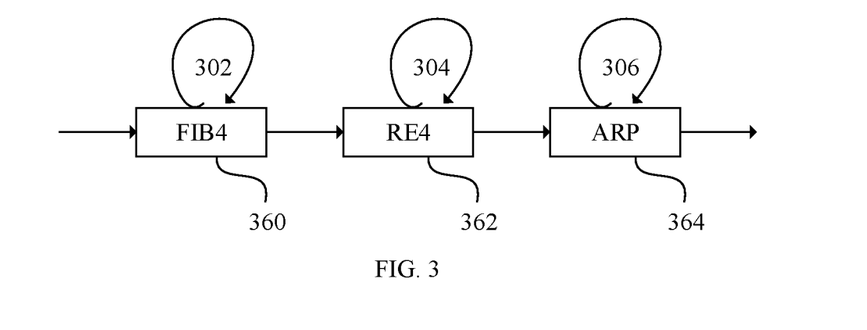
FIG. 3 is a flowchart of a method 300 for searching different forwarding tables in one forwarder according to an embodiment.

FIG. 3 is a flowchart of a method 300 for searching different forwarding entries in one forwarder according to an embodiment.

Content shown in FIG. 3 is a continuation of the content shown in FIG. 2. In terms of a table search sequence, a forwarder that performs the method shown in FIG. 3 is posterior to the forwarder that performs the method shown in FIG. 2, in other words, the forwarder that performs the method shown in FIG. 3 is located in a downstream direction for the forwarder that performs the method shown in FIG. 2.

302: The forwarder such as a forwarder 120b receives an IPv6 over IPv4 tunnel packet from the forwarder that performs step 214, for example, the forwarder 120a, and searches an FIB on an outbound interface board based on a VRID and an IPv4 destination IP address that are carried in the tunnel packet, to find an FIB entry FIB4 360 through matching, so as to obtain one RE index.

304: The forwarder determines a corresponding RE RE4 362 based on the RE index, and searches the RE4 362 by using the destination IP address of the tunnel packet, to obtain a next-hop IP address and outbound port information of the tunnel packet, where the outbound port information is an outbound port number or a TRUNK ID.

306: The forwarder searches an Address Resolution Protocol (ARP) table based on the next-hop IP address, the outbound port information, and the OVID of the tunnel packet to find an ARP entry ARP 364 through matching, so as to obtain a destination MAC address. In this way, the forwarder can continue to forward the tunnel packet by using the destination MAC address.

As described above, the methods 200 and 300 describe how two adjacent forwarders perform a plurality of table search operations and forward one tunnel packet after the table search operations succeed. The forwarders can forward packets that belong to different services, and the tunnel packet is only one type of the packets. When forwarding a packet that belongs to any service, one forwarder may need to perform a plurality of table search operations. After the table search operations succeed, the packet is forwarded to a next forwarder based on a table search result that is obtained through the plurality of table search operations and that is used to indicate a next-hop address. Some processing operations such as encapsulation, decapsulation, and security detection may be performed on the forwarded packet. It can be learned from the flowchart 200 and the flowchart 300 that, to forward the packet, each forwarder needs to search entries in the forwarder in sequence. Therefore, for one packet, it can be understood that entries in one forwarder are searched in sequence. For example, for the IPv6 over IPv4 tunnel packet in this embodiment, it may be considered that the forwarding entries 260, 262, 264, 266, 268, and 270 are arranged in terms of a table search sequence. The FIB6 260 is the first entry in these forwarding entries. The link layer encapsulation entry 270 is the last entry in these forwarding entries. Each entry has an adjacent entry in terms of the table search sequence. For example, the FIB6 260 is adjacent to the RE6 262, and the RE6 262 is adjacent to the TNL 264 and is also adjacent to the FIB 260.

Figure 4:
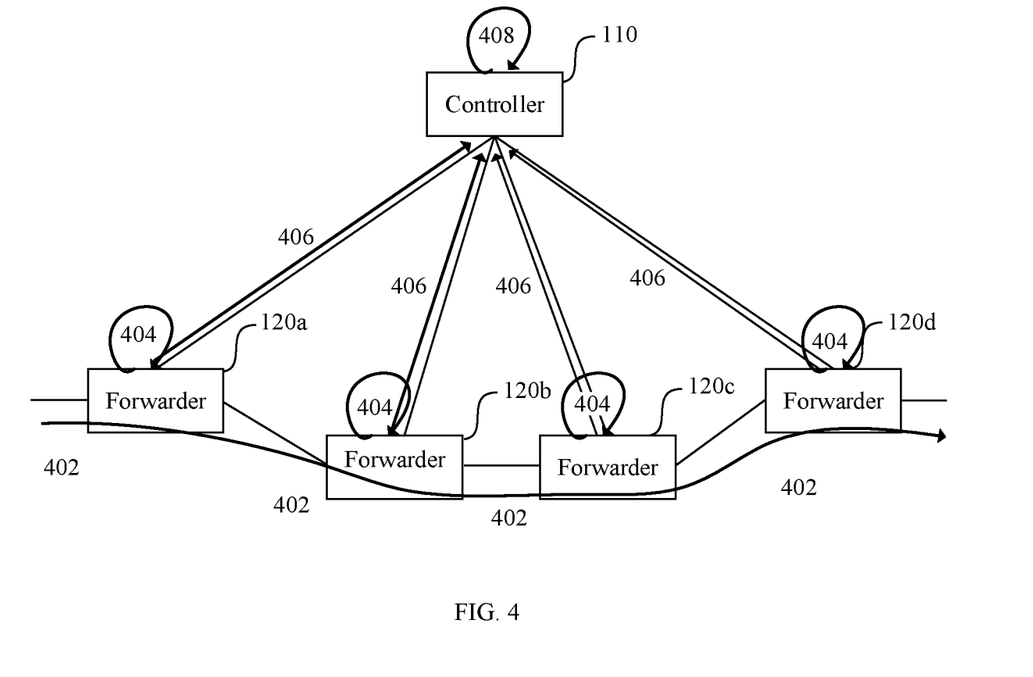
FIG. 4 is a flowchart of a forwarding fault determining method 400 according to an embodiment.

FIG. 4 is a flowchart of a forwarding fault determining method 400 according to an embodiment.

402: Forwarders 120 receive packets of a first service, search a plurality of forwarding tables in the forwarders 120, process the plurality of packets based on search results of the plurality of forwarding tables, and send the plurality of processed packets on a network. The scenario shown in FIG. 2 is used as an example. The plurality of forwarding tables may be some or all of an FIB table in which the forwarding entry FIB6 260 is located, an RE6 table in which the forwarding entry RE6 262 is located, a TNL table in which the forwarding entry TNL 264 is located, an FIB4 table in which the forwarding entry FIB4 266 is located, a TNL table in which the forwarding entry TNL 268 is located, and a link layer encapsulation table in which the link layer encapsulation entry 270 serving as a forwarding entry is located. The term "a plurality of" means two or more than two.

404: For the packets of the first service, the forwarders 120 separately determine a plurality of table search statistical results of the plurality of forwarding tables for the first service. One table search statistical result may indicate a quantity of success times, a success rate, a quantity of failure times, or a failure rate of searching, by each of the forwarders 120 one forwarding table based on packets of the first service that are received within a time period. For example, a forwarder 120a receives 100 packets of the first service within 5 s, and the forwarder 120a searches, for 100 times by using the 100 packets, the FIB in which the FIB 260 is located, where search results are obtained for 90 times based on the FIB 260. In this case, a table search statistical result of the forwarding table FIB for the first service may be 90 success times, a success rate 90%, 10 failure times, or a failure rate 10%.

406: Some or all of the forwarders 120 send the plurality of table search statistical results of the plurality of forwarding tables to a controller 110. The scenario shown in FIG. 2 is used as an example. The forwarders may send some or all of a table search statistical result of the FIB6 260, a table search statistical result of the RE6 262, a table search statistical result of the TNL 264, a table search statistical result of the FIB4 266, a table search statistical result of the TNL 268, and a table search statistical result of the link layer encapsulation entry 270 to the controller 110. The table search statistical result of the FIB6 260 is a brief expression of a table search statistical result of the forwarding table in which the FIB6 260 is located. Such a brief expression mode is also applicable to another table search statistical result.

408: The controller 110 determines a faulty forwarding table based on the plurality of received table search statistical results.

There may be a plurality of cases for content of the plurality of table search statistical results received by the controller 110.

Case 1

The plurality of table search statistical results include table search statistical results of two adjacent tables for the service, for example, the FIB table in which the FIB6 260 is located and the RE table in which the RE6 262 is located. In addition, the controller 110 may determine, in the two adjacent tables based on the two table search statistical results, that a table search statistical result of the first searched table such as the FIB table in which the FIB6 260 is located is normal, and the last searched table such as the RE table in which the RE6 262 is located is abnormal. The two adjacent tables may be located in one forwarder, or may respectively belong to two adjacent forwarders. For example, if the first searched table is the FIB4 360 shown in FIG. 3, the last searched table and the FIB4 360 are located in two adjacent forwarders instead of one forwarder.

Whether a table search statistical result of a forwarding table is normal or abnormal may be determined by comparing a threshold with a quantity of success times, a success rate, a quantity of failure times, or a failure rate of searching the forwarding table. The comparison may be performed by the controller or a forwarder. If the comparison is performed by the forwarder, the controller may directly learn, from the forwarder, whether a table search statistical result of a forwarding table is normal. In addition, that a table search statistical result of a forwarding table is normal or abnormal may also be a relative concept. The controller may determine whether a degree of a variation of a table search statistical result of a current forwarding table relative to a table search statistical result of an adjacent forwarding table behind the current forwarding table reaches a threshold. If the degree reaches the threshold, it may be considered that table search behavior of the adjacent forwarding table for a packet is abnormal, and table search behavior of the current forwarding table for a packet of the same service is normal. For example, when a table search success rate of the FIB6 260 is 90%, and a table search success rate of the adjacent RE6 262 behind the FIB6 260 is 60%, a success rate difference is 30%. If the threshold is 20%, it may be considered that table search behavior related to the RE6 262 is abnormal, in other words, related table search behavior relative to the FIB6 260 is abnormal; and table search behavior related to the FIB6 260 is normal, in other words, related table search behavior relative to the RE6 262 is normal.

In Case 1, because the table search statistical result of the first searched forwarding table is normal and the table search result of the last searched forwarding table is abnormal, the controller 110 determines that the last searched forwarding table is a faulty forwarding table.

Case 2

The plurality of table search statistical results received by the controller 110 include table search statistical results of two nonadjacent tables for the service. The plurality of table search statistical results do not include a table search statistical result of any table between the two nonadjacent tables. In the two nonadjacent tables, a table search statistical result of the first searched table is normal, and a table search statistical result of the last searched table is abnormal. The two nonadjacent tables may be located on one interface board, or may be located on different interface boards, or may be located in different forwarders. For example, the controller 110 receives a table search statistical result of the RE table in which the RE6 262 is located and a table search statistical result of the RE table in which the RE4 267 is located. The RE table in which the RE6 262 is located and the RE table in which the RE4 267 is located are located on one interface board. However, the controller 110 does not receive a table search result of the TNL table in which the TNL 264 is located, and does not receive a table search statistical result of the FIB table in which the FIB4 266 is located. In this example, the controller 110 may also receive a table search statistical result of the FIB table in which the FIB6 260 is located and table search statistical results of tables that are posterior to the RE4 267 in terms of a table search sequence, for example, a table search statistical result of the TNL table in which the TNL 268 is located and a table search statistical result of the LE table in which the LE 270 is located.

In Case 2, the controller 110 indicates one or two forwarders including the two tables to send, to the controller 110, table search statistical results of one or more intermediate tables that are between the two tables and that are used to forward the service. When the two tables belong to one forwarder, the forwarder may perform uploading according to the indication of the controller 110. Alternatively, when the two tables belong to two forwarders, the two adjacent forwarders and one or more forwarders that are between the two forwarders and that store the one or more intermediate tables may send the table search statistical results of the one or more intermediate tables for the service to the controller 110 according to the indication of the controller 110.

The controller 110 determines abnormal table search behavior based on the one or more received table search statistical results of the one or more intermediate tables. A specific method may include: determining two adjacent tables in the two nonadjacent tables and the one or more intermediate tables, where a table search statistical result of the first searched forwarding table is normal and a table search result of the last searched forwarding table is abnormal in the two adjacent tables; and determining that the last searched forwarding table is a faulty forwarding table. In an example, the two nonadjacent tables are respectively the RE table in which the RE6 262 is located and the RE table in which the RE4 267 is located, and the one or more intermediate tables are the TNL table in which the TNL 264 is located and the FIB table in which the FIB4 266 is located. When determining that the table search statistical result of the FIB table in which the FIB4 266 is located is normal and the table search statistical result of the RE table in which the RE4 267 is located is abnormal, the controller determines that the RE table in which the RE4 267 is located is a faulty forwarding table.

After the controller 110 determines, according to the foregoing method, that one forwarding table is a faulty forwarding table for one service, the controller 110 may consider that the foregoing result is determined or possible, and further needs to perform verification on the possible result. When the controller 110 considers that the foregoing result is possible, the controller 110 may perform verification on the possible result. When determining that one forwarding table in one forwarder is likely to be faulty for one service, the controller 110 may compare a table search statistical result of the forwarding table with a table search statistical result of a same type of forwarding table in another forwarder for the same service. For the service, the same type of forwarding table in the another forwarder is prior to the forwarding table that is likely to be faulty in terms of a table search sequence. In an example, the controller 110 determines that the RE table in which the RE4 362 is located is likely to be faulty for one service. In this case, the controller 110 may compare a table search statistical result, for the service, of the RE table in which the RE4 362 is located with a table search statistical result of a same type of forwarding table that is prior to the foregoing RE table in terms of the table search sequence, that is, the forwarding table in which the RE4 267 is located. When the table search statistical result of the same type of forwarding table is normal, the controller 110 may more accurately determine that the RE table in which the RE4 362 is located is faulty for the service.

In this embodiment, the controller 110 may determine a faulty forwarding table based on table search statistical results that are reported by forwarders and that are of a plurality of forwarding tables for a same service. Therefore, fault locating may be accurately performed, thereby facilitate subsequent fault processing, for example, fault rectification.

Figure 5:
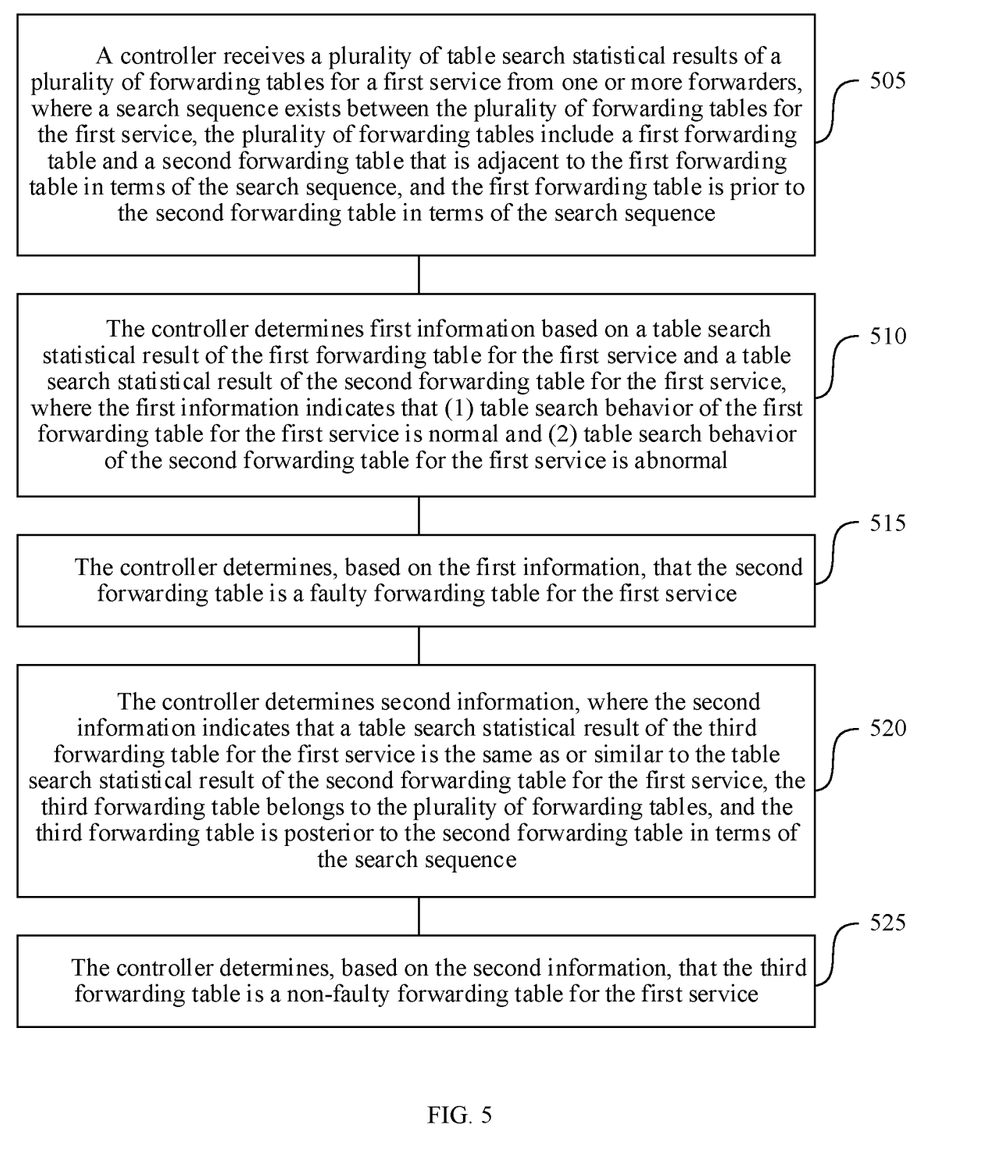
FIG. 5 is a flowchart of a forwarding fault determining method 500 according to an embodiment.

FIG. 5 is a flowchart of a forwarding fault determining method 500 according to an embodiment.

505: A controller receives a plurality of table search statistical results of a plurality of forwarding tables for a first service, where a search sequence exists between the plurality of forwarding tables for the first service, the plurality of forwarding tables include a first forwarding table and a second forwarding table that is adjacent to the first forwarding table in terms of the search sequence, and the first forwarding table is prior to the second forwarding table in terms of the search sequence. The controller may be the controller 110 shown in FIG. 1 or FIG. 4.

That a search sequence exists between forwarding tables in one or more forwarders for one service is described in the foregoing embodiments with reference to FIG. 2 and FIG. 3. For understanding of a search sequence and another related concept in this embodiment, refer to the descriptions in the foregoing embodiments. The one or more forwarders may be one or more forwarders 120 shown in FIG. 1 or FIG. 4. In an example, in this embodiment, the first forwarding table may be the FIB table in which the FIB6 260 is located, and the second forwarding table may be the RE table in which the RE6 262 is located; or the first forwarding table may be the RE table in which the RE4 267 is located, and the second forwarding table may be the TNL table in which the TNL 268 is located; or the first forwarding table may be the LE table in which the LE 270 is located, and the second forwarding table may be the FIB table in which the FIB4 360 is located. The plurality of forwarding tables may be all or some of the forwarding tables corresponding to the entries 260 to 270 shown in FIG. 2, or may be all or some of the forwarding tables corresponding to the entries 360 to 364 shown in FIG. 3, or may be all or some of the forwarding tables corresponding to the entries 260 to 268 shown in FIG. 2 and the entries 360 to 364 shown in FIG. 3.

The controller may receive the plurality of table search statistical results of the plurality of forwarding tables for the first service in a plurality of manners.

In an example, the controller may obtain the plurality of table search statistical results of the plurality of forwarding tables for the first service based on one request or without a need of sending a request.

Figure 6:
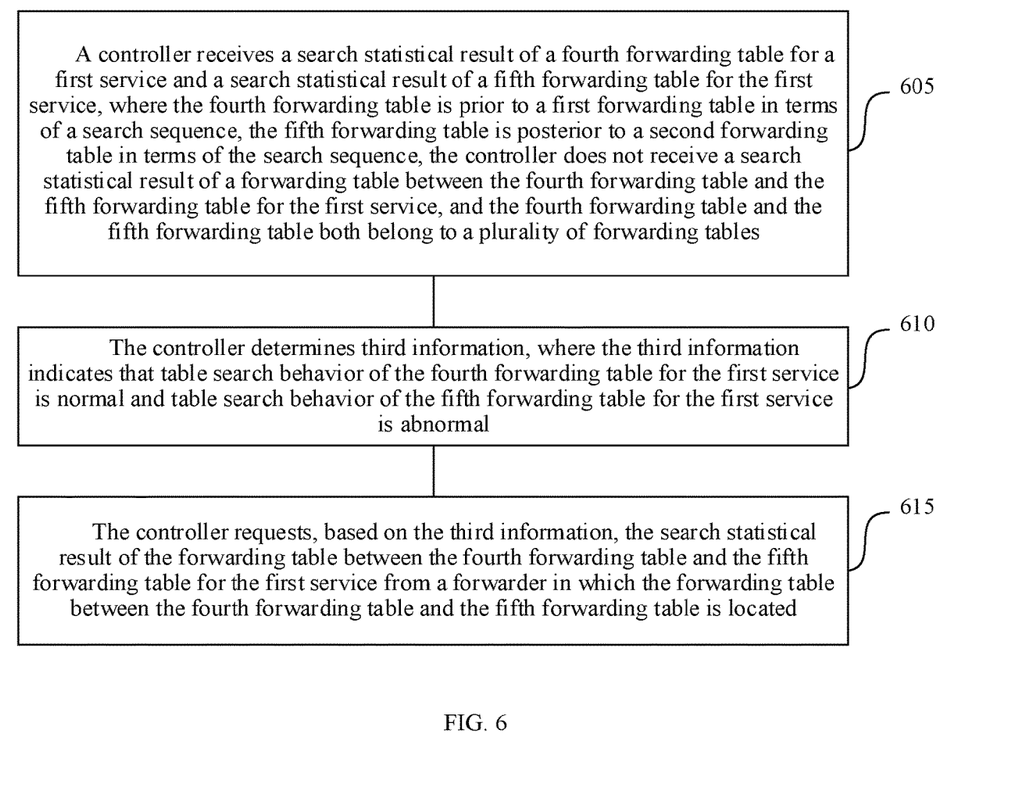
FIG. 6 is a flowchart of a method 600 in which a controller receives a plurality of table search statistical results according to an embodiment.

In another example, the controller may first obtain one or more table search statistical results of some of the plurality of forwarding tables for the first service. Subsequently, when required, the controller may obtain one or more table search statistical results of some or all of remaining forwarding tables in the plurality of forwarding tables for the first service based on requests sent to one or more forwarders. The method shown in FIG. 6 is a specific example of receiving the plurality of table search statistical results of the plurality of forwarding tables for the first service based on the foregoing idea. The detailed content in FIG. 6 is described in the following content.

After receiving the plurality of table search statistical results, the controller performs step 510 in the method 500.

510: The controller determines first information based on a table search statistical result of the first forwarding table for the first service and a table search statistical result of the second forwarding table for the first service, where the first information indicates that table search behavior of the first forwarding table for the first service is normal and table search behavior of the second forwarding table for the first service is abnormal.

That table search behavior of one forwarding table for one service is normal or abnormal is described in the foregoing embodiments. For understanding of whether table search behavior is normal or abnormal and a related concept in this embodiment, refer to the descriptions in the foregoing embodiments. Whether a table search statistical result of one forwarding table for one service is normal or abnormal may be determined by comparing a threshold with a quantity of success times, a success rate, a quantity of failure times, or a failure rate of searching the forwarding table for the service, or may be determined through another similar operation. The comparison may be performed by the controller or a forwarder. If the comparison is performed by the forwarder, the controller may directly learn, from the forwarder, whether a table search statistical result of a forwarding table is normal. In addition, that a table search statistical result of a forwarding table is normal or abnormal may also be a relative concept. The controller may determine whether a degree of a variation of a table search statistical result of a current forwarding table relative to a table search statistical result of an adjacent forwarding table behind the current forwarding table reaches a threshold. If the degree reaches the threshold, it may be considered that table search behavior of the adjacent forwarding table for a packet is abnormal, and table search behavior of the current forwarding table for a packet of the same service is normal. For example, when a table search success rate of the FIB6 260 is 90%, and a table search success rate of the adjacent RE6 262 behind the FIB6 260 is 60%, a success rate difference is 30%. If the threshold is 20%, it may be considered that table search behavior related to the RE6 262 is abnormal, in other words, related table search behavior relative to the FIB6 260 is abnormal; and table search behavior related to the FIB6 260 is normal, in other words, related table search behavior relative to the RE6 262 is normal.

The first service in this embodiment may be obtained through division at different granularities. The first service may be a native IPv4 service, an IPv4 over GRE service, a native IPv6 service, an IPv6 over IPv4 service, an L3VPN over SR service, an L2VPN over TE service, an EVPN over VxLAN service, or another similar service at a relatively fine granularity; or the first service may be an IPv4 service, an IPv6 service, an L3VPN service, an L2VPN service, or an EVPN service at a relatively coarse granularity.

515: The controller determines, based on the first information, that the second forwarding table is a faulty forwarding table for the first service.

In the first information, the table search behavior, for the first service, of the first forwarding table in front of the second forwarding table is normal, and a table search behavior, for the first service, of an adjacent forwarding table behind the first forwarding table, that is, the second forwarding table, is abnormal. Because the table search behavior of the first forwarding table for the first service is normal, the first forwarding table is non-faulty for the first service, and the second forwarding table is a faulty forwarding table for the first service. In addition, in some examples, the controller may alternatively verify whether the second forwarding table is a faulty forwarding table, proves, through the verification, that the second forwarding table is a faulty forwarding table, and subsequently determines that the second forwarding table is a faulty forwarding table. This verification process may also be referred to as a part of the operation that the controller determines, based on the first information, that the second forwarding table is a faulty forwarding table for the first service. Details about the verification are described in an embodiment corresponding to FIG. 7.

The embodiment shown in FIG. 5 may further include optional operations 520 and 525.

520: The controller determines second information, where the second information indicates that a table search statistical result of a third forwarding table in the plurality of forwarding tables for the first service is the same as or similar to the table search statistical result of the second forwarding table for the first service, and the third forwarding table is posterior to the second forwarding table in terms of the search sequence.

For example, if the first forwarding table is the FIB table in which the FIB6 260 shown in FIG. 2 is located, and the second forwarding table is the RE table in which the RE6 262 is located, the third forwarding table is the TNL table in which the TNL 264 is located. When the second forwarding table is determined as a faulty forwarding table for the first service, and the table search statistical result of the third forwarding table for the first service is the same as or similar to the table search statistical result of the second forwarding table for the first service, it indicates that the table search result of the third forwarding table for the first service is abnormal because the second forwarding table is faulty, and table search behavior of the third forwarding table for the first service is normal. Herein, "similar" means that a difference between two comparison objects is less than a specified standard, and the standard may be determined by a network administrator based on actual experience.

525: The controller determines, based on the second information, that the third forwarding table is a non-faulty forwarding table for the first service.

FIG. 6 is a flowchart of a method 600 in which a controller receives a plurality of table search statistical results according to an embodiment. The method is a specific example for implementing step 505. The method 600 shown in FIG. 6 may be based on steps 505 to 515, or may be based on steps 505 to 525.

605: The controller receives a search statistical result of a fourth forwarding table in the plurality of forwarding tables for the first service and a search statistical result of a fifth forwarding table in the plurality of forwarding tables for the first service, where the fourth forwarding table is prior to the first forwarding table in terms of the search sequence, the fifth forwarding table is posterior to the second forwarding table in terms of the search sequence, and the controller does not receive a search statistical result of a forwarding table between the fourth forwarding table and the fifth forwarding table for the first service.

In an example, the first forwarding table and the second forwarding table are respectively the forwarding table in which the TNL 264 is located and the forwarding table in which the FIB4 266 is located. In this case, the fourth forwarding table may be the forwarding table in which the RE6 262 is located or the forwarding table in which the FIB6 260 is located, and the fifth forwarding table may be the forwarding table in which any one of the forwarding entries 267 to 270 is located, or the forwarding table in which any one of the forwarding entries 267 to 364 is located.

610: The controller determines third information, where the third information indicates that table search behavior of the fourth forwarding table for the first service is normal and table search behavior of the fifth forwarding table for the first service is abnormal.

615: The controller requests, based on the third information, the search statistical result of the forwarding table between the fourth forwarding table and the fifth forwarding table for the first service from a forwarder in which the forwarding table between the fourth forwarding table and the fifth forwarding table is located.

When forwarding tables between the fourth forwarding table and the fifth forwarding table are located in one forwarder, the controller may request the forwarding tables between the fourth forwarding table and the fifth forwarding table from the forwarder. Alternatively, when forwarding tables between the fourth forwarding table and the fifth forwarding table are located in different forwarders, the controller needs to request the forwarding tables between the fourth forwarding table and the fifth forwarding table from the different forwarders.

Figure 7:
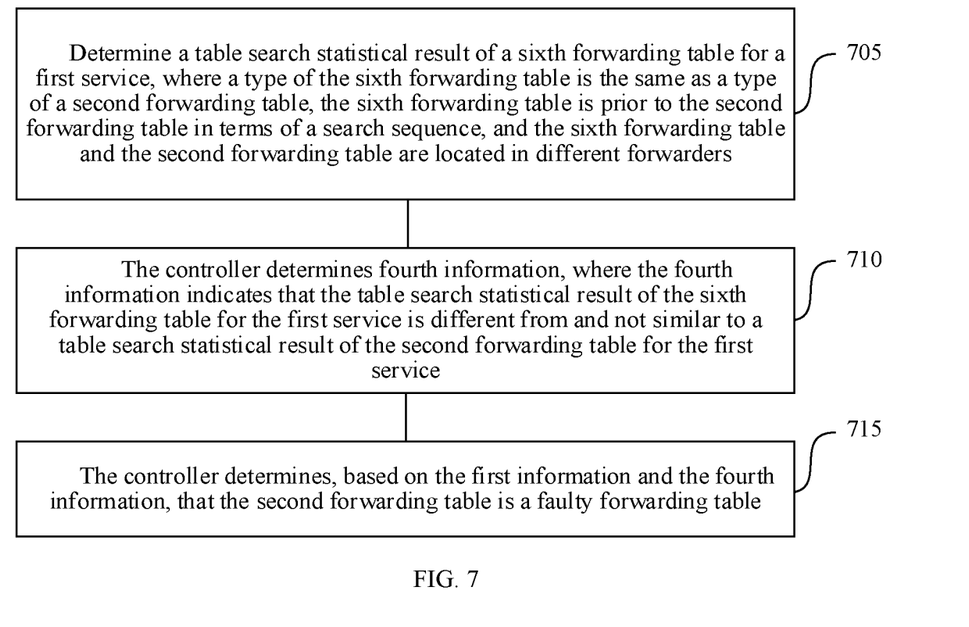
FIG. 7 is a flowchart of a method 700 for determining a faulty forwarding table according to an embodiment.

FIG. 7 is a flowchart of a method 700 for determining a faulty forwarding table according to an embodiment. The method 700 is a specific implementation of step 515.

705: The controller determines a table search statistical result of a sixth forwarding table for the first service, where a type of the sixth forwarding table is the same as a type of the second forwarding table, the sixth forwarding table is prior to the second forwarding table in terms of the search sequence, and the sixth forwarding table and the second forwarding table are located in different forwarders.

In an example, the second forwarding table is the RE forwarding table in which the RE4 362 shown in FIG. 3 is located in one forwarder. In this case, the sixth forwarding table may be an RE4 forwarding table that is in front of the RE4 forwarding table and that is located in another forwarder, for example, the RE4 forwarding table in which the RE4 267 shown in FIG. 2 is located. Two forwarding tables of a same type may be forwarding tables having a correspondence such as a same structure or a same field. The field correspondence is a correspondence between two fields. For example, when one field is an IP address and the other field is a MAC address, a field correspondence between the two fields is that the IP address corresponds to the MAC address.

710: The controller determines fourth information, where the fourth information indicates that the table search statistical result of the sixth forwarding table for the first service is different from and not similar to the table search statistical result of the second forwarding table for the first service, and "not similar" means that a difference between the two table search statistical results exceeds a specified threshold.

In an example, the table search statistical result of the sixth forwarding table for the first service is a table search success rate 90%, and the table search statistical result of the second forwarding table for the first service is a table search success rate 70%. The two table search statistical results are different. It is assumed that "similar" means that one table search statistical result is greater than or less than another table search statistical result by 10% in this example. In this case, for the sixth forwarding table, if a table search success rate of a target forwarding table ranges from 80% to 100%, a table search statistical result of the target forwarding table is similar to the table search statistical result of the sixth forwarding table. However, in this example, because the table search statistical result of the second forwarding table is the table search success rate 70% and is not within the range from 80% to 100%, it is considered that the table search statistical results of the two forwarding tables for the first service are not similar.

715: The controller determines, based on the first information and the fourth information, that the second forwarding table is a faulty forwarding table.

Through the foregoing verification, it can be more accurately determined that the second forwarding table is a faulty forwarding table.

Figure 8:
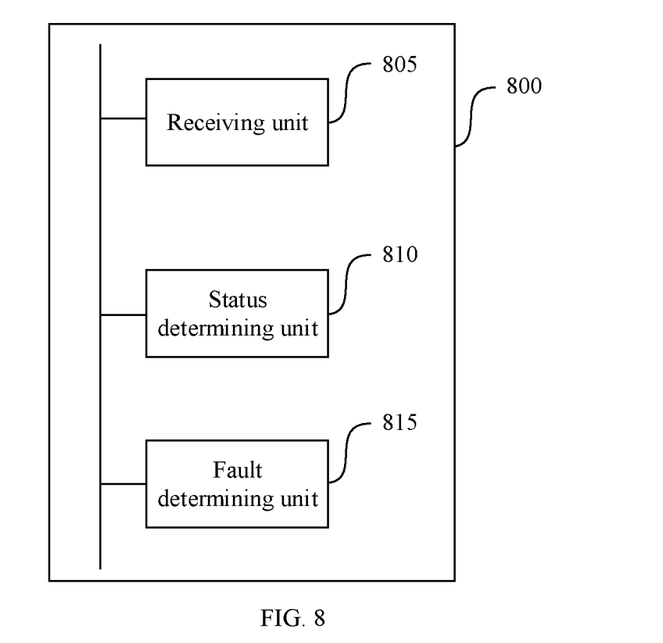
FIG. 8 is a schematic structural diagram of a controller 800 according to an embodiment.

FIG. 8 is a schematic structural diagram of a controller 800 according to an embodiment.

The controller 800 may be the controller 110 in the foregoing embodiment, and can perform, based on a plurality of units in the controller 800, all operations performed by the controller 110 in the foregoing embodiment. The controller 800 may perform, based on the plurality of units in the controller 800, all operations completed by the controller in the methods shown in FIG. 1 to FIG. 7.

As shown in FIG. 8, the controller 800 includes a receiving unit 805, a status determining unit 810, and a fault determining unit 815. The receiving unit 805, the status determining unit 810, and the fault determining unit 815 may be three independent hardware units, or may be three software units.

The receiving unit 805 is configured to receive a plurality of table search statistical results of a plurality of forwarding tables for a first service from one or more forwarders. A search sequence exists between the plurality of forwarding tables for the first service, the plurality of forwarding tables include a first forwarding table and a second forwarding table that is adjacent to the first forwarding table, and the first forwarding table is prior to the second forwarding table in terms of the search sequence.

The status determining unit 810 is configured to determine first information based on a table search statistical result of the first forwarding table for the first service and a table search statistical result of the second forwarding table for the first service. The first information indicates that table search behavior of the first forwarding table for the first service is normal and table search behavior of the second forwarding table for the first service is abnormal.

The fault determining unit 815 is configured to determine, based on the first information, that the second forwarding table is a faulty forwarding table for the first service.

The fault determining unit 815 may be further configured to: determine second information, where the second information indicates that a table search statistical result of a third forwarding table for the first service is the same as or similar to the table search statistical result of the second forwarding table for the first service, and the third forwarding table is posterior to the second forwarding table in terms of the search sequence; and determine, based on the second information, that the third forwarding table is a non-faulty forwarding table for the first service.

The receiving unit 805 may be further configured to: receive a search statistical result of a fourth forwarding table for the first service and a search statistical result of a fifth forwarding table for the first service, where the fourth forwarding table is prior to the first forwarding table in terms of the search sequence, the fifth forwarding table is posterior to the second forwarding table in terms of the search sequence, and the controller 800 does not receive a search statistical result of a forwarding table between the fourth forwarding table and the fifth forwarding table for the first service; determine third information, where the third information indicates that table search behavior of the fourth forwarding table for the first service is normal and table search behavior of the fifth forwarding table for the first service is abnormal; and request, based on the third information, the search statistical result of the forwarding table between the fourth forwarding table and the fifth forwarding table for the first service from one or more forwarders.

The fault determining unit 815 may be further configured to: determine a table search statistical result of a sixth forwarding table for the first service, where a type of the sixth forwarding table is the same as a type of the second forwarding table, the sixth forwarding table is prior to the second forwarding table in terms of the search sequence, and the sixth forwarding table and the second forwarding table are located in different forwarders; determine fourth information, where the fourth information indicates that the table search statistical result of the sixth forwarding table for the first service is different from and not similar to the table search statistical result of the second forwarding table for the first service; and determine, based on the first information and the fourth information, that the second forwarding table is a faulty forwarding table.

The first forwarding table and the second forwarding table are located in one forwarder, or located in different forwarders. The controller is a software-defined networking SDN controller, and the forwarder is an SDN forwarder. The first service is a native IPv4 service, an IPv4 over GRE service, a native IPv6 service, an IPv6 over IPv4 service, an L3VPN over SR service, an L2VPN over TE service, or an EVPN over VxLAN service. In addition, the first service may also be an IPv4 service, an IPv6 service, an L3VPN service, an L2VPN service, or an EVPN service.

Figure 9:
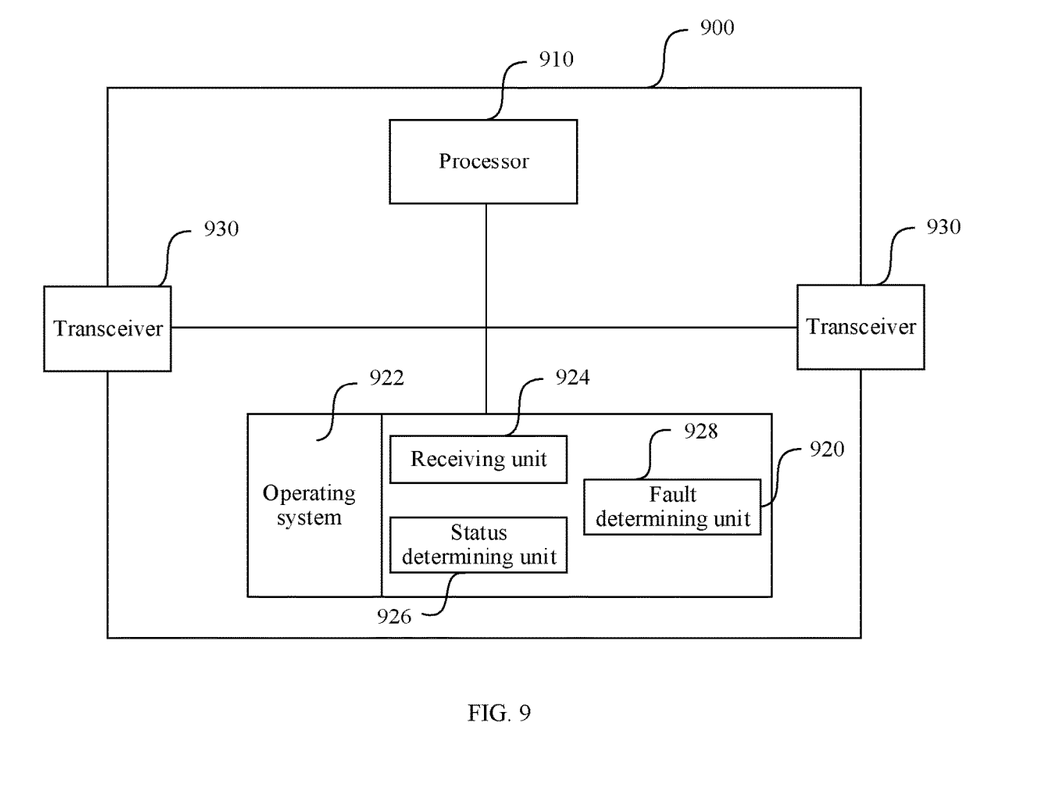
FIG. 9 is a schematic structural diagram of a controller 900 according to an embodiment.

FIG. 9 is a schematic structural diagram of a controller 900 according to an embodiment. As shown in FIG. 9, the controller 900 includes a processor 910, a memory 920 and transceivers 930 that communicate with the processor 910.

The processor 910 may include one or more central processing units (CPUs), one or more network processors (NPs), one or more application-specific integrated circuits (ASICs), one or more programmable logic devices (PLDs), or a combination of some or all of the foregoing types of devices that have a processing capability. The PLD may be a complex PLD (CPLD), a field-programmable gate array (FPGA), generic array logic (GAL), or any combination thereof The memory 920 may be one memory, or may include a plurality of memories. The memory 920 may include a volatile memory, for example, a random-access memory (RAM). Alternatively, the memory may include a non-volatile memory, for example, a read-only memory (ROM), a flash memory, a hard disk drive (HDD), or a solid-state drive (SSD). Alternatively, the memory may include a combination of the foregoing types of memories. The memory 920 stores a computer-readable instruction, and the computer-readable instruction includes an operating system 922 that is run by the controller 900 and a plurality of software units that are configured to implement the controller 900, for example, a receiving unit 924, a status determining unit 926, and a fault determining unit 928.

The transceivers 930 may be two interface boards, or may be different ports on one interface board.

When the processor 910 separately executes computer-readable instructions in the receiving unit 924, the status determining unit 926, and the fault determining unit 928 based on the operating system 922, the processor 910 may perform or the controller 900 is enabled to perform functions and operations performed by the receiving unit 805, the status determining unit 810, and the fault determining unit 815 in the processor 800.

After executing each software unit, the processor 910 may perform a corresponding operation according to an indication of each software unit. After executing the computer-readable instruction in the memory 920, the processor 910 may perform or the controller 900 is enabled to perform, according to an indication of the computer-readable instruction, all operations performed by the controller in the foregoing content, for example, the controller 110.

The foregoing descriptions are merely example specific implementations, but are not intended to limit the protection scope of the disclosure. Any variation or replacement readily figured out by a person skilled in the art within the disclosed technical shall fall within the protection scope of the disclosure.

What is claimed is:

1. A method implemented by a controller and comprising:
   receiving, from at least one forwarder, table search statistical results of forwarding tables for a first service, wherein the forwarding tables comprise a first forwarding table and a second forwarding table, wherein the second forwarding table is adjacent to and after the first forwarding table in a search sequence among the forwarding tables, wherein the table search statistical results comprise a first table search statistical result of the first forwarding table and a second table search statistical result of the second forwarding table, and wherein the first forwarding table and the second forwarding table are located in one forwarder;
   determining first information based on the first table search statistical result and the second table search statistical result, wherein the first information indicates that first table search behavior of the first forwarding table is normal and that second table search behavior of the second forwarding table is abnormal; and
   determining, based on the first information, that the second forwarding table is faulty.

2. The method of claim 1, wherein the forwarding tables further comprise a third forwarding table that is adjacent to and after the second forwarding table in the search sequence, and wherein the method further comprises:
   determining second information indicating that a third table search statistical result of the third forwarding table is the same as or similar to the second table search statistical result; and
   determining, based on the second information, that the third forwarding table is non-faulty.

3. The method of claim 1, wherein the forwarding tables further comprise a fourth forwarding table and a fifth forwarding table, wherein the fourth forwarding table is adjacent to and before the first forwarding table in the search sequence, wherein the fifth forwarding table is adjacent to and after the second forwarding table in the search sequence, wherein the table search statistical results comprise a fourth table search statistical result of the fourth forwarding table and a fifth table search statistical result of the fifth forwarding table, and wherein the method further comprises:
   receiving no additional search statistical result of an additional forwarding table between the fourth forwarding table and the fifth forwarding table for the first service;
   determining third information indicating that fourth table search behavior of the fourth forwarding table is normal and that fifth table search behavior of the fifth forwarding table is abnormal; and
   requesting, based on the third information and from a forwarder comprising the additional forwarding table, the additional search statistical result.

4. The method of claim 1, further comprising:
   determining a sixth table search statistical result of a sixth forwarding table for the first service, wherein the sixth forwarding table and the second forwarding table are of the same type but are located in different forwarders, and wherein the sixth forwarding table is adjacent to and before the second forwarding table in the search sequence;
   determining fourth information indicating that the sixth table search statistical result is not the same as or similar to the second table search statistical result; and
   further determining, based on the fourth information, that the second forwarding table is faulty.

5. The method of claim 1, wherein the controller is a software-defined networking (SDN) controller, and wherein the at least one forwarder is at least one SDN forwarder.

6. The method of claim 1, wherein the first service is a native Internet Protocol version 4 (IPv4) service, an IPv4 over Generic Routing Encapsulation (GRE) service, a native Internet Protocol version 6 (IPv6) service, an IPv6 over IPv4 service, a layer 3 virtual private network (L3VPN) over segment routing (SR) service, a layer 2 virtual private network (L2VPN) over traffic engineering (TE) service, or an Ethernet virtual private network (EVPN) over Virtual Extensible Local Area Network (VxLAN) service.

7. The method of claim 1, wherein the first service is an Internet Protocol version 4 (IPv4) service, an Internet Protocol version 6 (IPv6) service, a layer 3 virtual private network (L3VPN) service, a layer 2 virtual private network (L2VPN) service, or an Ethernet virtual private network (EVPN) service.

8. A controller comprising:
a memory configured to store instructions; and
one or more processors coupled to the memory and configured to execute the instructions to cause the controller to:
receive, from at least one forwarder, table search statistical results of forwarding tables for a first service, wherein the forwarding tables comprise a first forwarding table and a second forwarding table, wherein the second forwarding table is adjacent to and after the first forwarding table in a search sequence among the forwarding tables, wherein the table search statistical results comprise a first table search statistical result of the first forwarding table and a second table search statistical result of the second forwarding table, and wherein the first forwarding table and the second forwarding table are located in different forwarders;
determine first information based on the first table search statistical result and the second table search statistical result, wherein the first information indicates that first table search behavior of the first forwarding table is normal and that second table search behavior of the second forwarding table is abnormal; and
determine, based on the first information, that the second forwarding table is faulty.

9. The controller of claim 8, wherein the forwarding tables further comprise a third forwarding table that is adjacent to and after the second forwarding table in the search sequence, and wherein the one or more processors are further configured to execute the instructions to cause the controller to:
determine second information indicating that a third table search statistical result of the third forwarding table is the same as or similar to the second table search statistical result; and
determine, based on the second information, that the third forwarding table is non-faulty.

10. The controller of claim 8, wherein the forwarding tables further comprise a fourth forwarding table and a fifth forwarding table, wherein the fourth forwarding table is adjacent to and before the first forwarding table in the search sequence, wherein the fifth forwarding table is adjacent to and after the second forwarding table in the search sequence, wherein the table search statistical results comprise a fourth table search statistical result of the fourth forwarding table and a fifth table search statistical result of the fifth forwarding table, and wherein the one or more processors are further configured to execute the instructions to cause the controller to:
receive no additional search statistical result of an additional forwarding table between the fourth forwarding table and the fifth forwarding table for the first service;
determine third information indicating that fourth table search behavior of the fourth forwarding table is normal and that fifth table search behavior of the fifth forwarding table is abnormal; and
request, based on the third information and from a forwarder comprising the additional forwarding table, the additional search statistical result.

11. The controller of claim 8, wherein the one or more processors are further configured to execute the instructions to cause the controller to:
determine a sixth table search statistical result of a sixth forwarding table for the first service, wherein the sixth forwarding table and the second forwarding table are of the same type but are located in different forwarders, and wherein the sixth forwarding table is adjacent to and before the second forwarding table in the search sequence;
determine fourth information indicating that the sixth table search statistical result is not the same as or similar to the second table search statistical result; and
further determine, based on the fourth information, that the second forwarding table is faulty.

12. The controller of claim 8, wherein the controller is a software-defined networking (SDN) controller, and wherein the at least one forwarder is at least one SDN forwarder.

13. The controller of claim 8, wherein the first service is a native Internet Protocol version 4 (IPv4) service, an IPv4 over Generic Routing Encapsulation (GRE) service, a native Internet Protocol version 6 (IPv6) service, an IPv6 over IPv4 service, a layer 3 virtual private network (L3VPN) over segment routing (SR) service, a layer 2 virtual private network (L2VPN) over traffic engineering (TE) service, or an Ethernet virtual private network (EVPN) over Virtual Extensible Local Area Network (VxLAN) service.

14. The controller of claim 8, wherein the first service is an Internet Protocol version 4 (IPv4) service, an Internet Protocol version 6 (IPv6) service, a layer 3 virtual private network (L3VPN) service, a layer 2 virtual private network (L2VPN) service, or an Ethernet virtual private network (EVPN) service.

15. A computer program product comprising instructions that are stored on a non-transitory computer-readable medium and that, when executed by one or more processors, cause a controller to:
receive, from at least one forwarder, table search statistical results of forwarding tables for a first service, wherein the forwarding tables comprise a first forwarding table and a second forwarding table, wherein the second forwarding table is adjacent to and after the first forwarding table in a search sequence, wherein the table search statistical results comprise a first table search statistical result of the first forwarding table and a second table search statistical result of the second forwarding table, and wherein the first service is a native Internet Protocol version 4 (IPv4) service, an IPv4 over Generic Routing Encapsulation (GRE) service, a native Internet Protocol version 6 (IPv6) service, an IPv6 over IPv4 service, a layer 3 virtual private network (L3VPN) over segment routing (SR) service, a layer 2 virtual private network (L2VPN) over traffic engineering (TE) service, an Ethernet virtual private network (EVPN) over Virtual Extensible Local Area Network (VxLAN) service, an IPv4 service, an IPv6 service, an L3VPN service, an L2VPN service, or an EVPN service;

determine first information based on the first table search statistical result and the second table search statistical result, wherein the first information indicates that first table search behavior of the first forwarding table is normal and that second table search behavior of the second forwarding table is abnormal; and determine, based on the first information, that the second forwarding table is a faulty forwarding table.

16. The computer program product of claim 15, wherein the forwarding tables further comprise a third forwarding table that is adjacent to and after the second forwarding table in the search sequence, and wherein the instructions, when executed by the one or more processors, further cause the controller to:

determine second information indicating that a third table search statistical result of the third forwarding table is the same as or similar to the second table search statistical result; and determine, based on the second information, that the third forwarding table is non-faulty.

17. The computer program product of claim 15, wherein the forwarding tables further comprise a fourth forwarding table and a fifth forwarding table, wherein the fourth forwarding table is adjacent to and before the first forwarding table in the search sequence, wherein the fifth forwarding table is adjacent to and after the second forwarding table in the search sequence, wherein the table search statistical results comprise a fourth table search statistical result of the fourth forwarding table and a fifth table search statistical result of the fifth forwarding table, and wherein the instructions, when executed by the one or more processors, further cause the controller to:

receive no additional search statistical result of an additional forwarding table between the fourth forwarding table and the fifth forwarding table for the first service;

determine third information indicating that fourth table search behavior of the fourth forwarding table is normal and that fifth table search behavior of the fifth forwarding table is abnormal; and request, based on the third information and from a forwarder comprising the additional forwarding table, the additional search statistical result.

18. The computer program product of claim 15, wherein the instructions, when executed by the one or more processors, further cause the controller to:

determine a sixth table search statistical result of a sixth forwarding table for the first service, wherein the sixth forwarding table and the second forwarding table are of the same type but are located in different forwarders, and wherein the sixth forwarding table is adjacent to and before the second forwarding table in the search sequence;

determine fourth information indicating that the sixth table search statistical result is not the same as or similar to the second table search statistical result; and further determine, based on the fourth information, that the second forwarding table is faulty.

19. The computer program product of claim 15, wherein the first forwarding table and the second forwarding table are located in one forwarder.

20. The computer program product of claim 15, wherein the first forwarding table and the second forwarding table are located in different forwarders.

\* \* \* \* \*